J. W. TURNER & J. LEND.
DENTAL INSTRUMENT.
APPLICATION FILED JAN. 23, 1915.
1,184,052.
Patented May 23, 1916.
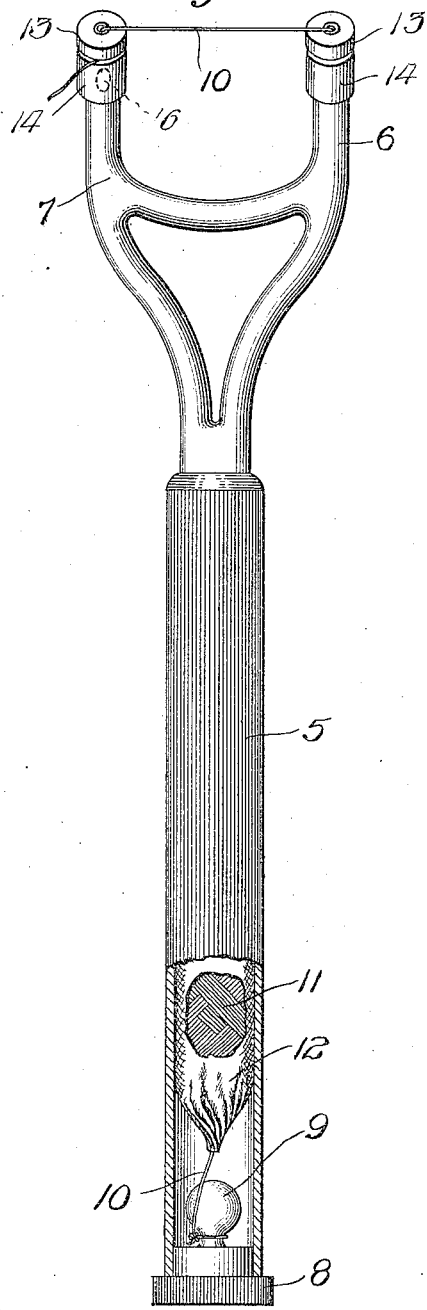
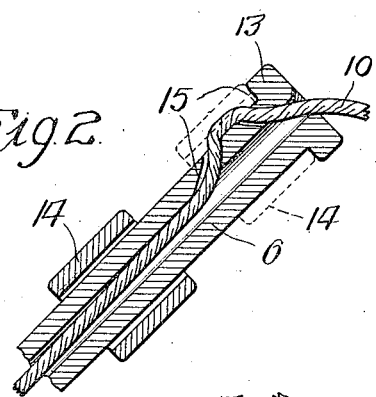
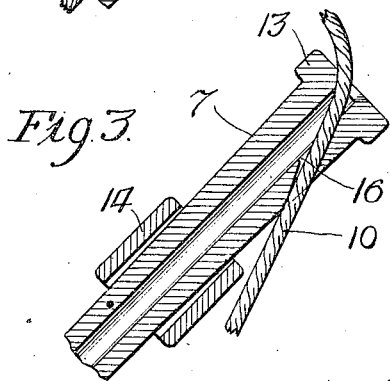
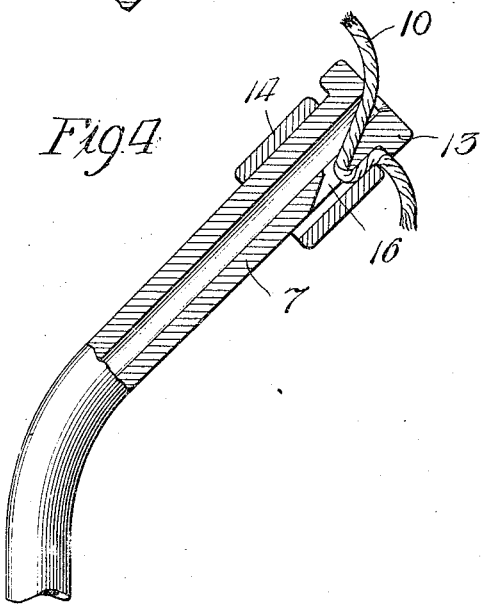
Witnesses:
Harry S. Gaither
Thomas C. Banning Jr.
Inventors:
John W. Turner
John Lend
by Banning & Banning Attys.

UNITED STATES PATENT OFFICE.

JOHN W. TURNER, OF OAK FOREST, AND JOHN LEND, OF CHICAGO, ILLINOIS; SAID LEND ASSIGNOR TO SAID TURNER.

DENTAL INSTRUMENT.

1,184,052.                    Specification of Letters Patent.    Patented May 23, 1916.

Application filed January 23, 1915. Serial No. 3,942.

*To all whom it may concern:*

Be it known that we, JOHN W. TURNER and JOHN LEND, citizens of the United States, residing at Oak Forest and Chicago, respectively, in the county of Cook and State of Illinois, have invented certain new and useful Improvements in Dental Instruments, of which the following is a specification.

This invention relates to a device for the purpose of facilitating the passing of dental floss, or other similar cleansing agent, between the teeth to remove accumulated food particles or other foreign matter therefrom.

In the present invention we seek to provide a means for the manipulation of dental floss which is simple and inexpensive to manufacture, and which presents no features of complication to an unskilled operator; to provide a dental instrument having means for retaining a quantity of dental floss to be used from time to time, together with means for feeding the same into position where it may act upon the teeth; and to provide means for preserving taut the portion of dental floss which is being used. The invention further consists in numerous other features of construction and combinations of parts which are hereinafter described and claimed.

In the drawing: Figure 1 is a front elevation of a device constructed in accordance with our invention; Fig. 2 is an enlarged detail in section of the extremity of one of the tubular fingers through which floss is threaded from the handle of the device; Fig. 3 is a view similar to Fig. 2 of the other tubular finger; and Fig. 4 is a view similar to Fig. 3 showing the clamping sleeve operating to lock the floss.

Our invention comprises essentially two principal parts, viz: a hollow handle 5 providing a receptacle for a supply of dental floss, and tubular fingers 6 and 7 leading therefrom, as best shown in Fig. 1. Access to the interior of the handle for placing therein a supply of floss is effected by removing an end cap 8 fitted with a knob or other suitable member 9 to which one end of the floss 10 may be conveniently attached.

The floss is represented as placed within the device in the form of a ball or skein 11, preferably wrapped within a covering 12, such as wax paper, to prevent contamination from outside sources. One end of the floss is threaded through the handle and the tubular finger 6, as appears in Fig. 1, and then across to the other finger 7, the portion so stretched between the two fingers being intended for use to cleanse the teeth.

The tubular finger 6 is equipped with a flange or bead 13 at its outer end, as is also the finger 7. Upon each of these fingers is arranged a sleeve 14 capable of executing a sliding and rotary movement. These fingers are each slightly enlarged toward its outer end, so that movement of the sleeve 14 to the extreme end of each finger is accompanied by an increased frictional resistance.

We provide in the finger 6 two openings 15 leading from the hollow interior of the tube to the outerside thereof, and through which the floss 10 is threaded, as indicated in Fig. 2. Movement of the sleeve 14 to the position indicated by the dotted lines results in a tight wedging of the section of floss lying exteriorly between the openings 15, thereby locking the floss against pulling movement.

The tubular finger 7 is provided with but a single opening 16, corresponding to the openings 15 in the finger 6. Through this opening 16 the floss passes as indicated in Fig. 3. When the sleeve 14 is moved to the position shown in Fig. 4, the section of floss passing through to the outside of the finger 7 is clamped and wedged in the manner shown in the said figure.

During use, it is contemplated that each sleeve 14 will be moved into clamping position, so that the section of floss stretched between the finger extremities will be held taut and in position serviceable for use. Whenever desired, fresh sections of floss may be brought into operative position by moving the sleeves from such clamping position, and pulling the floss sufficiently to bring a fresh section into operative position between the finger extremities. The sleeves are then moved to lock the floss in the manner described, the instrument thus being rendered serviceable for use.

The instrument which has been described is intended to hold a section of dental floss taut, so that it may be passed against or between the teeth to remove particles of matter which have been lodged therebetween. To this end the finger ends are shaped so as to better enable the user to manipulate the instrument. When the fingers of a person are used for this purpose, the application of the floss is usually difficult and clumsily effected, so that the use of an instrument, such as has been described, is highly desirable. It is, of course, contemplated that any suitable floss or other similar cleansing agent may be used in connection with the device in substantially the manner set forth.

We claim:

1. A dental instrument comprising, in combination, a pair of hollow fingers adapted to guide therewithin and hold therebetween a section of floss in operative position, each of said fingers being provided with a plurality of openings through which the floss may be looped to present a portion thereof exteriorily of said fingers, and a movable sleeve on each of said fingers arranged to engage with the looped portion of the floss lying exteriorily of the fingers to lock the floss against movement, substantially as described.

2. A dental instrument comprising, in combination, a pair of fingers adapted to hold therebetween a section of floss, each of said fingers being provided with a plurality of openings through which the floss may be looped to present a portion thereof exteriorly of said fingers, and means for engaging the looped portion of said floss lying exteriorly of said fingers to lock the same against movement, substantially as described.

3. A dental instrument comprising, in combination, a pair of hollow fingers adapted to hold therebetween a section of floss in operative position, each of said fingers being provided with a plurality of openings through which the floss may be looped to present a portion thereof exteriorly of said fingers, said fingers being tapered to a slightly greater diameter in the plane of said openings, and a sleeve on each of said fingers arranged to engage with the looped portion of said floss lying exteriorly of the fingers to lock the same against movement, substantially as described.

JOHN W. TURNER.
JOHN LEND.

Witnesses:
GERARD L. HOPE,
MARIE H. TURNER.